United States Patent [19]
Larson

[11] Patent Number: 4,778,285
[45] Date of Patent: Oct. 18, 1988

[54] EXTERNAL LUBRICANT RESERVOIR FOR JOINTS AND BEARINGS

[76] Inventor: Eldon E. Larson, 7500 Seabeck-Holly Rd. NW., Bremerton, Wash. 98312

[21] Appl. No.: 102,007

[22] Filed: Sep. 28, 1987

[51] Int. Cl.[4] .................. F16C 33/10; F16C 33/66; F16C 1/24; F01M 1/00

[52] U.S. Cl. .................................. 384/322; 141/329; 184/109; 384/386; 384/462; 464/7

[58] Field of Search .............. 384/322, 373, 374, 377, 384/386, 388, 398, 400, 401, 462, 471, 473, 606; 464/7, 11, 14; 184/109; 141/329, 114; 222/206

[56] References Cited

U.S. PATENT DOCUMENTS

| | | | |
|---|---|---|---|
| 654,882 | 7/1900 | Durand et al. | 384/473 |
| 890,735 | 6/1908 | Van Doren | 384/401 X |
| 976,365 | 11/1910 | Holehouse | 384/386 X |
| 1,371,006 | 3/1921 | Thiemer | 464/14 |
| 4,147,041 | 4/1979 | Girguis et al. | 464/11 |
| 4,317,341 | 3/1982 | Krude | 464/11 |
| 4,456,041 | 6/1984 | Grilli et al. | 141/329 |
| 4,534,449 | 8/1985 | Larson | 141/329 X |

*Primary Examiner*—Stuart S. Levy
*Assistant Examiner*—Thomas R. Hannon
*Attorney, Agent, or Firm*—Harry M. Cross, Jr.

[57] ABSTRACT

An external lubricant reservoir of the type that is replenished by injection is provided in the form of a flexible membrane sealed to a lubricant distributor. The lubricant distributor consists of a membrane-mounting disk and a lubricant feed tube. The feed tube communicates with the reservoir interior through a passage in the disk. The feed tube is designed to be inserted into a lubricant passage in the housing of a joint or a bearing. A preferred embodiment of the reservoir enables the membrane to be wedged between a joint or bearing housing and the underside of the membrane-mounting disk to effect a sealed connection between the two.

7 Claims, 1 Drawing Sheet

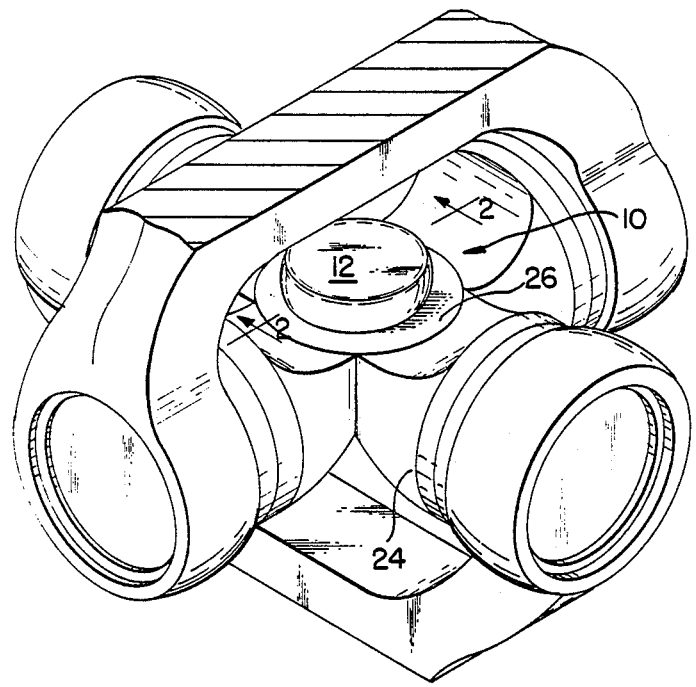
FIG. 1
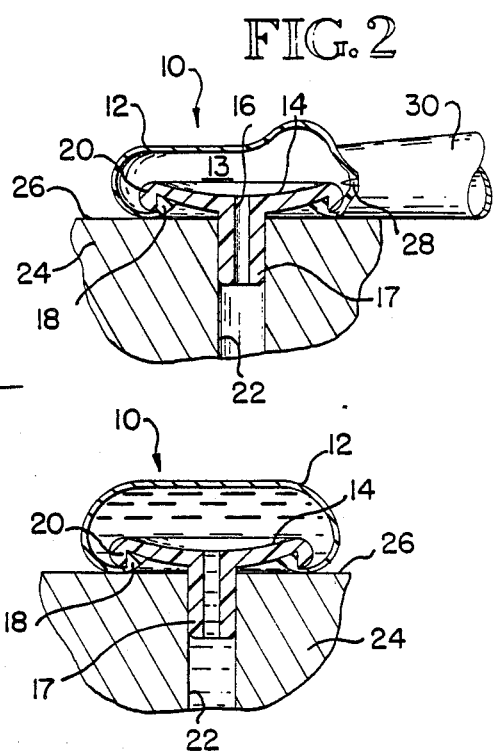
FIG. 2
FIG. 3
FIG. 4

EXTERNAL LUBRICANT RESERVOIR FOR JOINTS AND BEARINGS

FIELD OF THE INVENTION

This invention pertains to devices for lubricating moving mechanical joints and specifically to lubricant-holding reservoirs for such devices.

BACKGROUND OF THE INVENTION

Moving mechanical joints, such as universal joints, and bearings for drive shafts, and the like are often packaged with a so-called permanent lubricant. The lubricant is intended to last the life of the joint or bearing. However, it is often the case that the lubricant is dissipated or extruded from the joint or bearing and that loss causes the joint or bearing to fail. Had an adequate supply of the lubricant continued to exist, the joint or bearing would not have failed.

For a variety of reasons, many such devices are not provided with grease fittings such as the well-known zerc fitting. Consequently, the permanently-lubricated joints and bearings are unduly limited in their life spans.

A primary object of the present invention is to provide a lubricant reservoir that can be installed in so-called permanent-lubricated joints and bearings. A further object is to provide a lubricant reservoir that can be substituted for the conventional zerc fitting or other conventional grease fitting to provide for semi-automatic joint or bearing lubrication.

SUMMARY OF THE INVENTION

The lubricant reservoir of this invention comprises a flexible rubber or elastomeric membrane reservoir and a membrane-mounting lubricant distributor. The membrane reservoir is preferably provided as a dome-shaped member with a base opening of a size to fit over the periphery of the distributor. The reservoir membrane opening is defined by an annular edge configured to interfit with the distributor periphery. The distributor comprises a base disk and a lubricant feeding tube secured to the disk in communication with a lubricant passage extending through the disk. The disk periphery is configured to interfit with the reservoir membrane edge to provide a sealed connection so that lubricant can be contained within the reservoir under pressure without escaping except through the feed tube.

In one embodiment of the invention, the reservoir is designed to be mounted onto a joint, such as a universal joint, with the feed tube inserted into a grease aperture that leads to the interior of the joint. In this embodiment, the base disk is configured to trap the membrane edge between the disk and the joint housing to seal the membrane around the disk.

In another embodiment, the reservoir disk is designed to be mounted onto an elongated feed tube such that the reservoir membrane and base disk are held in an elevated position. In this embodiment, the membrane edge may be retained against the disk edge by an encircling clamp that binds the membrane to the disk.

BRIEF DESCRIPTION OF THE DRAWINGS

FIG. 1 is a perspective view of a universal joint with the lubricant reservoir of this invention mounted on the joint trunnion cross;

FIG. 2 is a cross section view of the reservoir taken along the line 2—2 of FIG. 1;

FIG. 3 is another view of the reservoir, similar to FIG. 2, with the reservoir membrane shown filled with lubricant and fully expanded as a consequence thereof; and FIG. 4 illustrates the reservoir after a period of use wherein some of the lubricant has left the reservoir and gone into the joint whereby the partially empty condition of the reservoir is visually and tactilely apparent.

DETAILED DESCRIPTION OF THE INVENTION

With respect to FIGS. 1 and 2, the reservoir 10 of this invention comprises a flexible membrane dome 12 and a base disk 14 to which the membrane is fitted. The base disk has an axial passage 16 therethrough that extends into a lubricant feed tube 17. The membrane is dome-shaped and has an open bottom defined by an inwardly and upwardly turned annular edge 18. That edge 18 interfits with an outwardly and downwardly turned peripheral edge 20 of disk 14. The adjacent surfaces of the two edges are parallel and in contact as shown. When the fill tube 16 is inserted into an aperture 22 provided therefore in joint trunnion cross 24, the membrane edge is clamped between disk edge 20 and the surface 26 of cross 24. As the reservoir is filled with lubricant, shown in FIG. 3, the reservoir membrane 12 expands and enlarges and the adjacent vertical surfaces of edges 18 and 20 are drawn into more intimate contact to reinforce the seal between membrane 12 and disk 14.

Membrane 12 is fabricated out of a flexible natural rubber or a suitable synthetic rubber elastomer. The membrane wall is appropriately thin so that the membrane dome can expand and stretch somewhat as lubricant under pressure is forced into the reservoir. Suitable compositions for the membrane include, in addition to natural rubber, various of the nitrile rubbers (NBR's) such as are used in the manufacture of O-rings, various of the butyl rubbers used as inner tube and gasket compositions, as well as some of the EPDM membrane compositions as used in roofing applications.

The exact composition of the material from which the membrane is made is not part of this invention. It just simply must be resistant to hydrocarbons and impervious to the lubricant which it will contain, be flexible and stretchable and moldable into the dome shape required by this invention. Choice of a suitable material is within the ordinary skill of the art to which this invention pertains.

The reservoir is sealed against the exterior surroundings. Lubricant must be introduced directly through the wall of the membrane 12. This is accomplished, as shown in FIGS. 2 and 3, by a membrane-piercing needle 28 that makes a minute hole through which an appropriate device 30 forces lubricant into the dome interior 13. An appropriate device for introducing lubricant therein is described in U.S. Pat. Nos. 4,639,249 and 4,534,449 granted to the inventor herein. Such a lubricating device positions a tight dike around the tiny, pierced passage through the membrane wall, and hydraulically injects lubricant through the passage without affecting the membrane's integrity or natural resiliency. As seen in FIG. 2, when the device 30 is applied to the membrane 12, the V-shaped contacting element of the device 30 bears against the disk edge 20 for support as the piercing needle 28 is inserted through the membrane wall.

As lubricant is injected into the reservoir of this invention, as shown in FIG. 3, lubricant 32 within the reservoir will pass through feed tube 17 into the joint or bearing housing until filled, and then the membrane 12 will extend and expand as additional lubricant is injected. When the membrane is filled, the tension within the membrane will apply pressure to the contained body of lubricant to continue to urge lubricant to pass from the reservoir into the housing. As lubricant gradually passes into the housing, the membrane will deflate and appear partially empty, as shown for example in FIG. 4. Moreover, the membrane and its contents will feel flabby and not taut to the touch, thereby indicating that additional lubricant can be added if desired. Because the reservoir condition can be seen and felt, it will be apparent when more lubrication ought to be added to the reservoir to prevent the joint or bearing from running out of lubricant. Furthermore, because the membrane 12 will expand during lubricant replenishment, there is less liklihood that excess lubricant will dislocate bearing seals.

In appropriate situations, the membrane edge may be formed as a cylindrical vertical edge that is not turned inward and upward. In such a configuration, either an integrally molded or a separately provided metal band may used to secure the membrane edge to the disk 14. In this configuration, the disk need not secure the membrane seal wedging the membrane against a lower surface 26. The reservoir may be located some distance from the joint or bearing and connected thereto by an elongated feed tube 17. Lubricant can be transferred from the remote reservoir to the joint or bearing by various modes, such as gravity, capillary action and atmospheric pressure, any one or all of which can play a roll in moving the lubricant into the joint or bearing from a pedestal-type mounting.

The disk 14 and feed tube 17 are preferably integral and formed of molded plastic. The disk and feed tube combination are stiff enough to be fairly rigid.

The reservoir of this invention is suitable for use with a variety of lubricants. Such lubricants are conventionally called greases and may consist of a wide range of ingredients. They commonly have a viscous consistency ranging from that of a paste to almost that of an oil. One advantage in using the reservoir of this invention is that a thinner-consistency lubricant can be used than the conditions would otherwise indicate because the reservoir provides a confined volume of additional lubricant for feeding into the joint or bearing as needed.

While a preferred embodiment of the lubricant reservoir of this invention has been described, certain changes may be made without departing from the scope of the invention. Consequently, the scope of the invention is only to be delimited by the appended claims herein.

What is claimed is:

1. An external lubricant reservoir comprising a flexible dome-shaped membrane formed of rubber or synthetic rubber and having a bottom opening defined by an annular edge, and a lubricant distributor having a circular disk secured to the membrane annular edge and having a lubricant feed tube extending from said disk and communicating with the interior of said membrane through a lubricant passage through said disk, said membrane and said disk forming a unitary combination whereby lubricant is injectable through a pierced self-sealing opening in the membrane wall into the interior thereof to fill the reservoir, said distributor having a peripheral edge portion elevated beyond said feed tube a sufficient distance and cooperating with said membrane whereby a lubricant injector may be indexed against said distributor perhipheral edge to enable said membrane wall to be selectively pierced in the vicinity of said peripheral edge for lubricant injection when said reservoir is connected to a device requiring lubrication.

2. An external lubricant reservoir comprising a flexible dome-shaped membrane formed of rubber or synthetic rubber and having a bottom opening defined by an annular edge, and a lubricant distributor having a circular disk secured to the membrane annular edge and having a lubricant feed tube extending from said disk and communicating with the interior of said membrane through a lubricant passage through said disk, said membrane and said disk forming a unitary combination whereby lubricant is injectable through a pierced self-sealing opening in the membrane wall into the interior thereof to fill the reservoir, said disk being formed concave upward to provide a peripheral edge under which said membrane annular edge extends to provide a seal between said disk and said membrane, said disk edge and said membrane annular edge being shaped to provide parallel surfaces that contact one another when said reservoir contains lubricant therein.

3. The reservoir of claim 2 wherein said disk and said feed tube are integral and said disk passage extends axially through said disk.

4. The reservoir of claim 2 wherein the annular edge of said membrane is turned upward and inward to interfit with the peripheral edge of said disk, the contact surface of said membrane edge facing radially outward and the contact surface of said disk edge facing radially inward whereby pressure from lubricant contained within said reservoir will tend to force the parallel contact surfaces together.

5. The reservoir of claim 4 wherein said disk annular edge is raised above the plane where the feed tube joins the disk underside whereby the membrane will be wedged between a joint or bearing housing and the disk when the reservoir is installed to provide a sealed connection between the membrane and the disk.

6. In combination with a sealed lubricant- requiring joint or bearing having an external housing, the improvement comprising an external lubricant reservoir comprising a flexible dome-shaped membrane formed of rubber or synthetic rubber and having a bottom opening defined by an annular edge, and a lubricant distributor having a circular disk secured to the membrane annular edge and having a lubricant feed tube extending from said disk and connected to said housing and communicating with the interior of said membrane through a lubricant passage through said disk, said membrane and said disk forming a unitary combination whereby lubricant is injectable through a pierced self-sealilng opening in the membrane wall into the interior thereof to fill the reservoir , said distributor having a peripheral edge portion elevated beyond said feed tube a sufficient distance and cooperating with said membrane whereby a lubricant injector may be indexed against said distributor perhipheral edge to enable said membrane wall to be selectively pierced in the vicinity of said peripheral edge for lubricant injection when said reservoir is connected to a device requiring lubrication.

7. An external lubricant reservoir comprising a flexible dome-shaped membrane formed of rubber or synthetic rubber and having a bottom opening defined by an annular edge, and a lubricant distributor having a circular disk secured to the membrane annular edge and having a lubricant feed tube extending from said disk and communicating with the interior of said membrane through a lubricant passage through said disk, said membrane and said disk forming a unitary combination whereby lubricant is injectable through a pierced self-sealing opening in the membrane wall into the interior thereof to fill the reservoir, said disk is concave upward to provide a raised peripheral edge under which said membrane annular edge extends to provide a seal between said disk and said membrane whereby the membrane will be wedged between the housing and the disk to provide a sealed connection between the membrane and the disk.

* * * * *